US012410354B2

(12) United States Patent
Fuse et al.

(10) Patent No.: US 12,410,354 B2
(45) Date of Patent: Sep. 9, 2025

(54) HEAT TRANSFER MEDIUM AND THERMAL MANAGEMENT SYSTEM

(71) Applicant: DENSO CORPORATION, Kariya (JP)

(72) Inventors: Takuya Fuse, Kariya (JP); Shinya Kasamatsu, Kariya (JP); Kouji Inagaki, Kariya (JP); Ryuta Kobayakawa, Kariya (JP); Saori Nakajima, Kariya (JP)

(73) Assignee: DENSO CORPORATION, Kariya (JP)

( * ) Notice: Subject to any disclaimer, the term of this patent is extended or adjusted under 35 U.S.C. 154(b) by 852 days.

(21) Appl. No.: 17/386,977

(22) Filed: Jul. 28, 2021

(65) Prior Publication Data

US 2021/0355362 A1  Nov. 18, 2021

Related U.S. Application Data

(63) Continuation-in-part of application No. PCT/JP2020/003445, filed on Jan. 30, 2020.

(30) Foreign Application Priority Data

Feb. 1, 2019 (JP) .................................. 2019-017186

(51) Int. Cl.
| | | |
|---|---|---|
| *C09K 5/10* | (2006.01) | |
| *C09K 5/14* | (2006.01) | |
| *C09K 5/20* | (2006.01) | |
| *F28D 20/00* | (2006.01) | |

(52) U.S. Cl.
CPC .................. *C09K 5/10* (2013.01); *C09K 5/14* (2013.01); *C09K 5/20* (2013.01); *F28D 20/0034* (2013.01)

(58) Field of Classification Search
CPC .... C09K 5/10; C09K 5/14; C09K 5/20; F28D 20/0034
See application file for complete search history.

(56) References Cited

U.S. PATENT DOCUMENTS

| | | | | |
|---|---|---|---|---|
| 3,047,507 A | * | 7/1962 | Winslow | ............ C10M 171/001 |
| | | | | 252/75 |
| 4,508,631 A | * | 4/1985 | Packo | ...................... C09K 5/04 |
| | | | | 252/78.3 |
| 4,873,011 A | | 10/1989 | Jung et al. | |
| 4,965,385 A | | 10/1990 | Jung et al. | |
| 5,087,717 A | | 2/1992 | Jung et al. | |
| 7,393,464 B2 | * | 7/2008 | Wenderoth | .............. B60L 50/72 |
| | | | | 252/75 |
| 8,202,444 B2 | * | 6/2012 | Wenderoth | ............... C09K 5/20 |
| | | | | 252/75 |
| 9,587,154 B2 | * | 3/2017 | Yang | ..................... C23F 11/149 |
| 2002/0040896 A1 | | 4/2002 | Ap | |
| 2004/0028971 A1 | | 2/2004 | Wenderoth et al. | |
| 2006/0027782 A1 | | 2/2006 | Wenderoth et al. | |
| 2007/0104988 A1 | | 5/2007 | Nishii et al. | |
| 2007/0298291 A1 | | 12/2007 | Nishii et al. | |
| 2013/0099157 A1 | | 4/2013 | Lievens et al. | |
| 2014/0070134 A1 | * | 3/2014 | Woyciesjes | .............. C09K 5/10 |
| | | | | 252/75 |
| 2016/0318499 A1 | | 11/2016 | Yamanaka et al. | |

FOREIGN PATENT DOCUMENTS

| | | | | |
|---|---|---|---|---|
| CN | 101955755 B | * | 7/2013 | ............... C09K 5/20 |
| JP | H01172485 A | | 7/1989 | |
| JP | 2000323146 A | | 11/2000 | |
| JP | 2001167778 A | | 6/2001 | |
| JP | 2004524652 A | | 8/2004 | |
| JP | 2005203148 A | | 7/2005 | |
| JP | 3732181 B2 | | 1/2006 | |
| JP | 2006057088 A | | 3/2006 | |
| JP | 2006510168 A | | 3/2006 | |
| JP | 2014203739 A | | 10/2014 | |
| JP | 2014533308 A | | 12/2014 | |
| JP | 2015131597 A | | 7/2015 | |

OTHER PUBLICATIONS

Machine translation CN 101955755 B to Zhu, published Jul. 24, 2013 (Year: 2013).*

* cited by examiner

*Primary Examiner* — Jane L Stanley
(74) *Attorney, Agent, or Firm* — Harness, Dickey & Pierce, P.L.C.

(57) ABSTRACT

A heat transfer medium for transferring heat from a vehicle driving battery that generates heat during charging and discharging includes a liquid base material, an orthosilicic acid ester compatible with the base material, and an ion adsorbent dispersed in the base material. The ion adsorbent is formed of a plurality of solid particles and adsorbs at least one of anions and cations present in the heat transfer medium.

11 Claims, 4 Drawing Sheets

HEAT TRANSFER MEDIUM AND THERMAL MANAGEMENT SYSTEM

CROSS REFERENCE TO RELATED APPLICATIONS

This application is a continuation-in-part application of International Patent Application No. PCT/JP2020/003445 filed on Jan. 30, 2020, which designated the U.S. and claims the benefit of priority from Japanese Patent Application No. 2019-017186 filed on Feb. 1, 2019. The entire disclosure of all of the above application is incorporated herein by reference.

TECHNICAL FIELD

The present disclosure relates to a heat transfer medium and a thermal management system.

BACKGROUND ART

There has been a thermal management system for a vehicle. Such a system includes a vehicle driving battery that supplies electric power to a traveling motor, a liquid heat transfer medium that carries heat from the battery, a heat receiver at which the heat transfer medium receives heat from the battery through heat exchange, and a heat exchanger at which the heat transfer medium releases heat by exchanging the heat with refrigerant for a refrigeration cycle system. In this system, the battery is cooled by transferring heat from the battery to the refrigerant of the refrigeration cycle system through the heat transfer medium.

SUMMARY

According to one aspect of the present disclosure, a heat transfer medium transfers heat from a vehicle driving battery that generates heat during charging and discharging. The heat transfer medium includes a liquid base material, an orthosilicic acid ester compatible with the base material, and an ion adsorbent dispersed in the base material.

The ion adsorbent is formed of a plurality of solid particles and adsorbs at least one of anions and cations present in the heat transfer medium.

According to another aspect of the present disclosure, a thermal management system is mounted in a vehicle. The system includes a vehicle driving battery that generates heat during charging and discharging, a liquid heat transfer medium that transfers heat received from the battery, a heat receiver that is configured to cause the heat transfer medium to receive the heat through heat exchange with the battery, and a heat exchanger that is configured to cause the heat transfer medium to release the heat through heat exchange with a heat exchange medium. The heat transfer medium includes a liquid base material, an orthosilicic acid ester compatible with the base material, and an ionic adsorbent dispersed in the base material. The ion adsorbent is formed of a plurality of solid particles and adsorbs ions that are at least one of anions and cations present in the heat transfer medium and are released from the heat exchanger into the heat transfer medium.

According to yet another aspect, a thermal management system is configured to control heat generated from a heat generator during charging and discharging or through power conversion. The system includes a heat transfer medium that transfers the heat from the heat generator, a heat transfer medium circuit through which the heat transfer medium flows. The heat medium circuit includes a heat exchanger that is configured to cause the heat transfer medium to release the heat through heat exchange with a heat exchange medium. The heat transfer medium includes a liquid base material and a Si compound represented by following formula (I), (II), or (III).

($R^1$ to $R^3$ in formula (I) are groups that are the same or different from each other and do not contain oxygen directly bound to Si in the formula. Z in formula (I) represents a group that contains oxygen directly bound to Si in the formula.)

($R^1$ and $R^2$ in formula (II) are groups that are the same or different from each other and do not contain oxygen directly bound to Si in the formula. $Z^1$ and $Z^2$ in formula (II) are groups that are the same or different from each other and contain oxygen directly bound to Si in the formula.)

(R in formula (III) represents a water-insoluble group that does not contain oxygen directly bound to Si in the formula. $Z^1$, $Z^2$, and $Z^3$ in formula (III) are groups that are the same or different from each other and contain oxygen directly bound to Si in the formula.)

According to yet another aspect of the present disclosure, a heat transfer medium that transfers heat from a heat generator. The medium includes a liquid base material and a Si compound represented by following formula (I), (II), or (III).

($R^1$ to $R^3$ in formula (I) are groups that are the same or different from each other and do not contain oxygen directly bound to Si in the formula. Z in formula (I) represents a group that contains oxygen directly bound to Si in the formula.)

(II)

($R^1$ and $R^2$ in formula (II) are groups that are the same or different from each other and do not contain oxygen directly bound to Si in the formula. $Z^1$ and $Z^2$ in formula (II) are groups that are the same or different from each other and contain oxygen directly bound to Si in the formula.)

(III)

(R in formula (III) represents a water-insoluble group that does not contain oxygen directly bound to Si in the formula. $Z^1$, $Z^2$, and $Z^3$ in formula (III) are groups that are the same or different from each other and contain oxygen directly bound to Si in the formula.)

DESCRIPTION OF EMBODIMENTS

To begin with a relevant technology will be described only for understanding the following embodiments.

In the above-described system, if the heat transfer medium has a high electrical conductivity, a short circuit occurs when the heat transfer medium is leaked and comes into contact with the battery. Therefore, it is desired that the heat transfer medium has a low electrical conductivity.

In view of this, the present inventors have studied usability of a liquid base material and an orthosilicic acid ester as a heat transfer medium. The orthosilicic acid ester can be used in place of an ionic rust inhibitor. Accordingly, an amount of the ionic rust inhibitor can be reduced as compared to a conventional heat transfer medium containing an ionic rust inhibitor. Otherwise, the heat transfer medium may not include an ionic rust inhibitor. As a result, the electrical conductivity of the heat transfer medium can be lowered as compared with a conventional heat transfer medium containing an ionic rust inhibitor.

However, if such a heat transfer medium continues to be used, the heat transfer medium becomes acidic and ions are generated in the heat transfer medium. The reason why the heat transfer medium becomes acidic is that the heat transfer medium is thermally decomposed and/or the heat transfer medium absorbs carbon dioxide in air. Further, when the heat transfer medium is continuously used, ions are released into the heat transfer medium from flow passage forming members, and their deposits, that define flow passages therein for the heat transfer medium. Thus, an amount of ions increases in the heat transfer medium over time. As a result, the electrical conductivity of the heat transfer medium increases. For the reasons above, the present inventors have found that it would be difficult to decrease electrical conductivity of the heat transfer medium.

One objective of the present disclosure is to provide a heat transfer medium and a vehicle thermal management system where an electrical conductivity of the heat transfer medium can be kept in in a low level over time.

To achieve the above objective, according to one aspect of the present disclosure, a heat transfer medium transfers heat from a vehicle driving battery that generates heat during charging and discharging. The heat transfer medium includes a liquid base material, an orthosilicic acid ester compatible with the base material, and an ion adsorbent dispersed in the base material.

The ion adsorbent is formed of a plurality of solid particles and adsorbs at least one of anions and cations present in the heat transfer medium.

Accordingly, an amount of the ionic rust inhibitor can be reduced as compared to a conventional heat transfer medium containing an ionic rust inhibitor. Otherwise, the heat transfer medium may not include an ionic rust inhibitor. As a result, the electrical conductivity of the heat transfer medium can be lowered as compared to a conventional heat transfer medium containing an ionic rust inhibitor.

Further, even if an amount of the ions increases in the heat transfer medium, the increased ions can be adsorbed by the ion adsorbent. Therefore, it is possible to prevent ions from increasing in the heat transfer medium. Thus, the electrical conductivity of the heat transfer medium can be kept in a low level over time.

According to another aspect of the present disclosure, a vehicle thermal management system is mounted in a vehicle. The system includes a vehicle driving battery that generates heat during charging and discharging, a liquid heat transfer medium that transfers heat received from the battery, a heat receiver that is configured to cause the heat transfer medium to receive the heat through heat exchange with the battery, and a heat exchanger that is configured to cause the heat transfer medium to release the heat through heat exchange with a heat exchange medium. The heat transfer medium includes a liquid base material, an orthosilicic acid ester compatible with the base material, and an ionic adsorbent dispersed in the base material. The ion adsorbent is formed of a plurality of solid particles and adsorbs ions that are at least one of anions and cations present in the heat transfer medium and are released from the heat exchanger into the heat transfer medium.

Accordingly, an amount of the ionic rust inhibitor can be reduced as compared to a conventional heat transfer medium containing an ionic rust inhibitor. Otherwise, the heat transfer medium may not include an ionic rust inhibitor. As a result, the electrical conductivity of the heat transfer medium can be lowered as compared to a conventional heat transfer medium containing an ionic rust inhibitor.

Further, the present inventors have found that an increase in the electrical conductivity of the heat transfer medium is greatly affected by ions released from the heat exchanger. According to the vehicle thermal management system, even if an amount of the ions released from the heat exchanger increases in the heat transfer medium, the increased ions can be adsorbed by the ion adsorbent. Therefore, it is possible to prevent ions from increasing in the heat transfer medium. Thus, the electrical conductivity of the heat transfer medium can be kept in a low level over time.

Next, a plurality of embodiments of the present disclosure will be described below with reference to the drawings. In the following embodiments, the same reference numerals are assigned to parts that are the same or equivalent to each other to describe the same.

First Embodiment

Figure 1:
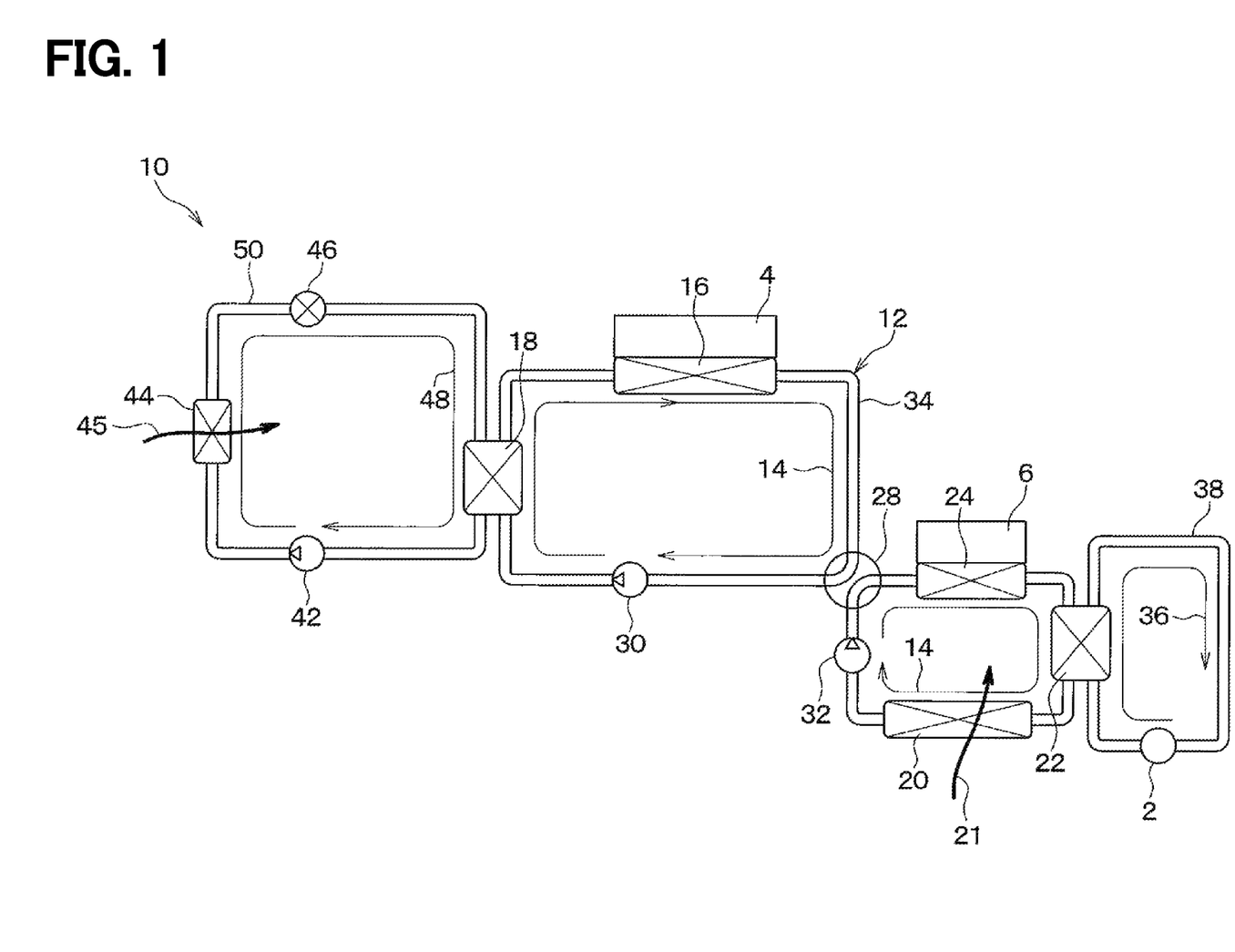
FIG. 1 is a schematic view showing an overall configuration of a vehicle thermal management system according to a first embodiment where a flow of a heat transfer medium is illustrated when the heat transfer medium is at a first flow state.

The vehicle thermal management system 10 shown in FIG. 1 is mounted in an electric vehicle. Hereinafter, the vehicle thermal management system 10 is simply referred to as a "system 10". The electric vehicle receives a driving force from a traveling electric motor 2. For example, the electric vehicle may be an electrically-powered vehicle, a plug-in hybrid vehicle, an electric two-wheeled vehicle, or the like. The number of wheels and usage of the electric vehicle are not limited to the above-described examples. The electric vehicle includes the traveling electric motor 2, a battery 4, and an inverter 6.

The traveling electric motor 2 is a motor generator that converts electric power supplied from the battery 4 into driving power for the vehicle, and also converts the driving power for the vehicle into electric power during deceleration of the vehicle. The traveling electric motor 2 generates heat during the power conversion between the driving power and the electric power. Thus, the traveling electric motor 2 may be one example of a heat generator which generates heat through power conversion.

The battery 4 is a battery for traveling the vehicle and is configured to supply electric power to the traveling electric motor 2. The battery 4 stores electricity supplied from the traveling electric motor 2 during deceleration of the vehicle. The battery 4 can also store electricity supplied from an external power source (that is, a commercial power source) when the vehicle is stopped. The battery 4 generates heat during charging and discharging. Thus, the battery 4 may be one example of a heat generator which generates heat during charging and discharging.

The inverter 6 is a power conversion device that converts electric power supplied from the battery 4 to the traveling electric motor 2 from direct current into alternating current. Further, the inverter 6 converts the electric power supplied from the traveling electric motor 2 to the battery 4 from alternating current to direct current. The inverter 6 generates heat when converting the electric power. Thus, the inverter 6 may be one example of a heat generator which generates heat through power conversion.

The system 10 manages heat generated from the traveling electric motor 2, the battery 4, the inverter 6, and the like. The system 10 includes the battery 4, a heat transfer medium 14, a heat receiver 16, a refrigerant heat exchanger 18, an air heat exchanger 20, an oil heat exchanger 22, an inverter heat exchanger 24, a flow path switching unit 28, a first pump 30, a second pump 32, and hoses 34.

The heat transfer medium 14 carries the heat received from the battery 4. The heat transfer medium 14 is liquid in use and does not undergo a phase change. Details of the heat transfer medium will be described later.

The heat receiver 16 causes the heat transfer medium 14 to receive the heat by heat exchange with the battery 4. Heat is transferred from the battery 4 to the heat transfer medium 14 via constituting members of the heat receiver 16. The heat receiver 16 may be configured so that the battery 4 is immersed in the heat transfer medium 14 and heat is directly transferred from the battery 4 to the heat transfer medium 14.

The refrigerant heat exchanger 18 is a heat exchanger that is configured to cause the heat transfer medium 14 to release heat through heat exchange with a refrigerant 48, as a heat exchange medium, for a cooling cycle system. The air heat exchanger 20 is a heat exchanger that is configured to release heat from the heat transfer medium 14 by exchanging the heat with air 21, as a heat exchanger medium, outside of the vehicle. The air 21 is supplied to the air heat exchanger 20 by operating a blower (not shown).

The oil heat exchanger 22 is a heat exchanger that is configured to cause the heat transfer medium 14 to receive heat from an oil 36 through heat exchange with the oil 36 that has received heat from the travelling electric motor 2. The oil heat exchanger 22 is connected to an oil passage portion of the travelling electric motor 2 via a pipe 38 through which the oil 36 flows.

The inverter heat exchanger 24 is a heat exchanger that is configured to cause the heat transfer medium 14 to receive heat through heat exchange with the inverter 6. Each of the heat receiver 16, the refrigerant heat exchanger 18, the air heat exchanger 20, the oil heat exchanger 22, and the inverter heat exchanger 24 includes a portion that is in contact with the heat transfer medium 14 and is made of a material including aluminum.

Each of the first pump 30 and the second pump 32 is a fluid mechanism that feeds the heat transfer medium 14. Each of the hoses 34 is a flow passage forming member that defines a flow passage through which the heat transfer medium 14 flows.

The heat receiver 16, the refrigerant heat exchanger 18, the air heat exchanger 20, the oil heat exchanger 22, the inverter heat exchanger 24, the flow path switching unit 28, the first pump 30, and the second pump 32 are connected to each other through the hoses 34. As a result, the heat transfer medium circuit 12 in which the heat transfer medium 14 circulates is formed.

Specifically, the heat receiver 16, the flow path switching unit 28, the first pump 30, and the refrigerant heat exchanger 18 are connected to each other to form an annular shape. Further, the flow path switching unit 28, the inverter heat exchanger 24, the oil heat exchanger 22, the air heat exchanger 20, and the second pump 32 are connected to each other to form an annular shape.

Figure 2:
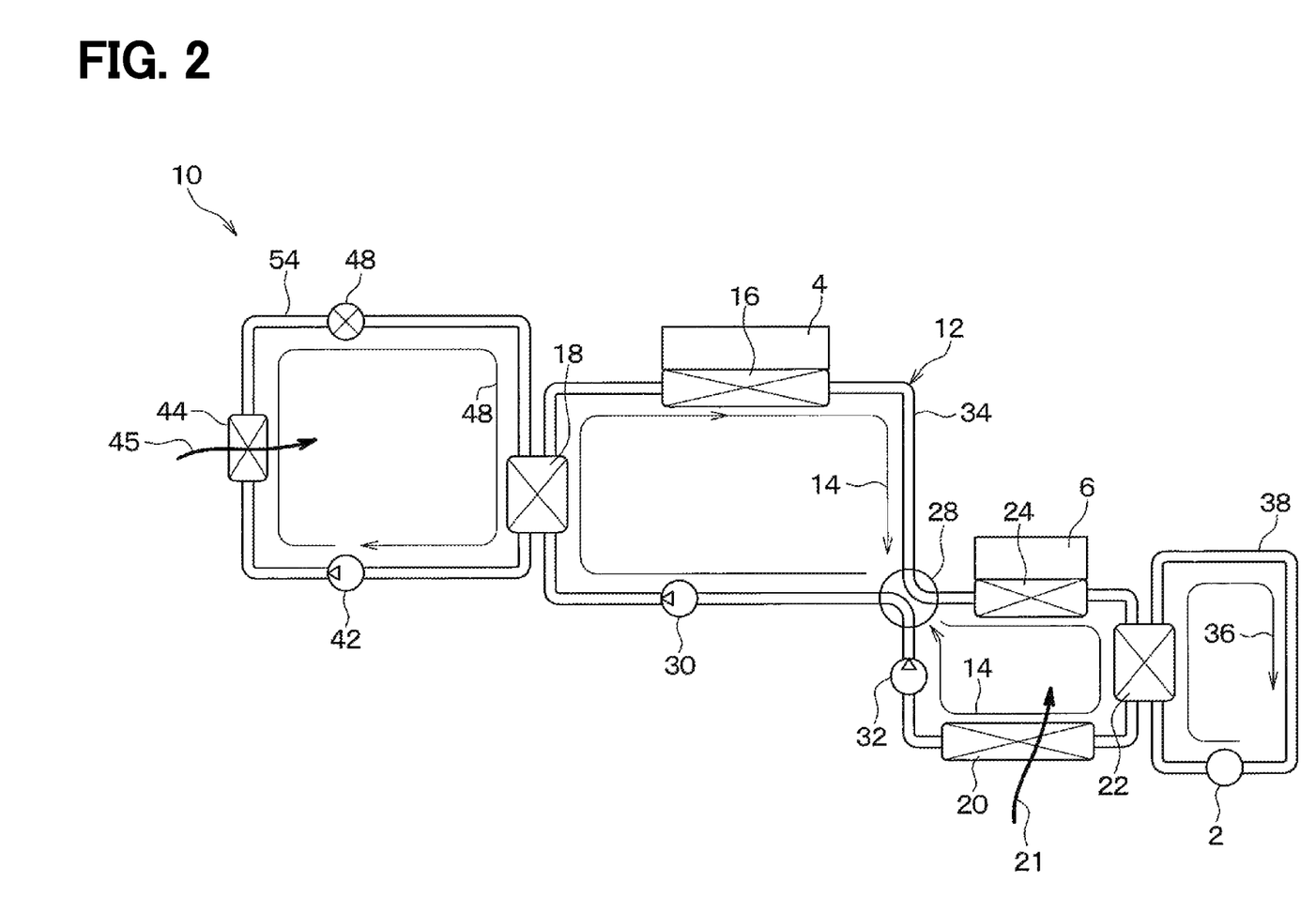
FIG. 2 is a schematic view showing an overall configuration of the vehicle thermal management system according to the first embodiment where a flow of the heat transfer medium is illustrated when the heat transfer medium is at a second flow state.

The flow path switching unit 28 switches a flow state of the heat transfer medium 14 between a first flow state and a second flow state. The first flow state is a state where, as shown in FIG. 1, the heat transfer medium 14 circulates through the first pump 30, the refrigerant heat exchanger 18, the heat receiver 16, and the first pump 30 in this order, and in addition to this flow, the heat transfer medium 14 circulates through the second pump 32, the inverter heat exchanger 24, the oil heat exchanger 22, the air heat exchanger 20, and the second pump 32 in this order. The second flow state is a state where, as shown in FIG. 2, the heat transfer medium 14 circulates through the first pump 30, the refrigerant heat exchanger 18, the heat receiver 16, the inverter heat exchanger 24, the oil heat exchanger 22, the air heat exchanger 20, the second pump 32, and the first pump 30 in this order.

Further, as shown in FIG. 1, the system 10 includes a compressor 42, a refrigerant radiator 44, and an expansion valve 48. These devices 42, 44, 46 and the refrigerant heat exchanger 18 constitute a vapor-compression-type refrigeration cycle system. These devices 42, 44, 46 and the refrigerant heat exchanger 18 are connected to each other through a pipe 50 through which the refrigerant 48 flows.

The compressor 42 compresses and discharges sucked refrigerant. The refrigerant radiator 44 is a heat exchanger that causes the refrigerant 48 to release heat through heat exchange between an air 45 outside of the vehicle shown in FIGS. 1 and 2 and the refrigerant 48 By operating a blower (not shown), the air 45 outside of the vehicle is supplied to the refrigerant radiator 44. The expansion valve 46 decompresses and expands the refrigerant 48. The refrigerant heat exchanger 18 is also a heat absorber that causes the refrigerant 48 to absorb heat through heat exchange between the refrigerant 48 and the heat transfer medium 14.

In the system 10 of the present embodiment, a first cooling mode for cooling the battery 4 using only the refrigerant heat exchanger 18 as a radiator that causes the heat transfer medium 14 to release heat and a second cooling mode for cooling the battery 4 using both the refrigerant heat exchanger 18 and the air heat exchanger 20 as radiators that cause the heat transfer medium 14 to release heat can be selectively performed.

(First Cooling Mode for the Battery 4)

During this mode, in the heat transfer medium circuit 12, the flow path switching unit 28 sets the flow state of the heat transfer medium 14 to the first flow state, as shown in FIG. 1. The air 45 outside of the vehicle is supplied to the refrigerant radiator 44.

By operating the first pump 30, the heat transfer medium 14 circulates through the heat receiver 16, and the refrigerant heat exchanger 18 in this order. At this time, the heat transfer medium 14 receives heat from the battery 4 at the heat receiver 16. The heat transfer medium 14 releases heat to the refrigerant 48 at the refrigerant heat exchanger 18. Thus, the battery 4 is cooled. On the other hand, the refrigerant 48 releases heat to the air 45 outside of the vehicle at the refrigerant radiator 44.

By operating the second pump 32, the heat transfer medium 14 circulates through the inverter heat exchanger 24, the oil heat exchanger 22, and the air heat exchanger 20 in this order. At this time, the heat transfer medium 14 receives heat from the inverter 6 at the inverter heat exchanger 24. The heat transfer medium 14 receives heat from the oil 36 at the oil heat exchanger 22. The heat transfer medium 14 releases heat to the air 21 at the air heat exchanger 20. As a result, the inverter 6 and the driving electric motor 2 are cooled.

(Second Cooling Mode for the Battery 4)

During this mode, in the heat transfer medium circuit 12, the flow path switching unit 28 sets the flow state of the heat transfer medium 14 to the second flow state, as shown in FIG. 2. The air 45 outside of the vehicle is supplied to the refrigerant radiator 44.

By operating the first pump 30 and the second pump 32, the heat transfer medium 14 circulates through the heat receiver 16, the inverter heat exchanger 24, the oil heat exchanger 22, the air heat exchanger 20, and the the refrigerant heat exchanger 18 in this order. At this time, the heat transfer medium 14 receives heat from the battery 4, the inverter 6, and the oil 36. The heat transfer medium 14 releases heat to the refrigerant 48 at the refrigerant heat exchanger 18 and releases heat to the air 21 at the air heat exchanger 20. As a result, the battery 4, the inverter 6, and the electric motor 2 are cooled.

Next, the heat transfer medium 14 of the present embodiment will be described. The heat transfer medium 14 includes a liquid base material, an orthosilicic acid ester, and an ionic adsorbent, and does not include an ionic rust inhibitor.

The base material is a base for the heat transfer medium 14. The liquid base material is used in a liquid form. As the base material, water containing a freezing point depression agent is used. Water is used since it has a large heat capacity, is inexpensive, and has a low viscosity. The freezing point depression agent is added to the water so that the water can be kept in a liquid form even when an environmental temperature falls below the freezing point. The freezing point depression agent dissolves in water and lowers the freezing point of the water. As the freezing point depression agent, an organic alcohol (e.g., alkylene glycol or a derivative thereof) is used. As the alkylene glycol, monoethylene glycol, monopropylene glycol, polyglycol, glycol ether, or glycerin may be used alone or as a mixture thereof. The freezing point depression agent is not necessarily limited to organic alcohol, and inorganic salts and the like may be used.

The orthosilicic acid ester is compatible with the base material. The orthosilicic acid ester is a compound for imparting a rust inhibitive property to the heat transfer medium 14. Since the heat transfer medium 14 includes the orthosilicic acid ester, the heat transfer medium 14 has a rust inhibitive property. Therefore, the heat transfer medium 14 need not include an ionic rust inhibitor.

As the orthosilicic acid ester, a compound represented by a general formula below is used.

[Chemical Formula 1]

In the general formula, each of the substituents $R^1$ to $R^4$ are the same or different from each other, and is an alkyl substituent having 1 to 20 carbon atoms, an alkenyl substituent having 2 to 20 carbon atoms, a hydroxyalkyl substituent having 1 to 20 carbon atoms, a substituted or unsubstituted aryl group having 6 to 12 carbon atoms, and/or a glycol ether-substituent of a formula $-(CH_2-CH_2-O)$n-$R^5$. $R^5$ represents hydrogen or alkyl having 1 to 5 carbon atoms. n represents any one of numbers of 1 to 5.

Typical examples of the orthosilicic acid ester may be pure tetraalkoxysilanes such as tetramethoxysilanes, tetraethoxysilanes, tetra (n-propoxy) silanes, tetra (isopropoxy) silanes, tetra (n-butoxy) silanes, tetras. (t-butoxy) silane, tetra (2-ethylbutoxy) silane, or tetra (2-ethylhexoxy) silane, as well as tetraphenoxysilane, tetra (2-methylphenoxy) silane, tetravinyloxysilane, tetraallyloxysilane, tetra (2-hydroxyethoxy) silane, tetra (2-ethoxyethoxy) silane, tetra (2-butoxyethoxy) silane, tetra (1-methoxy-2-propoxy)

silane, tetra (2-methoxyethoxy) silane or tetra [2-[2-(2-methoxyethoxy) ethoxy] ethoxy] silane.

It is preferable to use, as the orthosilicic acid ester, a compound where in the above general formula the substituents $R^1$ to $R^4$ are the same as each other and are the alkyl substituents having 1 to 4 carbon atoms or the glycol ether substituents of the formula —$(CH_2—CH_2—O)n-R^5$, the substituent $R^5$ is hydrogen, methyl, or ethyl, and n represents a number of 1, 2 or 3.

The orthosilicic acid ester is included in the heat transfer medium 14 so that the mass concentration of silicon with respect to the entire heat transfer medium 14 falls within the range of 1 to 10000 mass ppm. Preferably, the mass concentration of the silicon is set to fall within the range of 1 mass ppm, inclusive, to 2000 mass ppm, inclusive. Alternatively, the concentration of the silicon is preferably set to fall within the range of 2000 mass ppm, non-inclusive, to 10000 mass ppm, inclusive.

The above orthosilicic acid ester is commercially available or can be produced by transesterifying 1 equivalent of tetramethoxysilane with 4 equivalents of a corresponding long chain alcohol or phenol and then by distilling off methanol. The heat transfer medium 14 may include an azole derivative as a rust inhibitor in addition to the orthosilicic acid ester.

Figure 3:
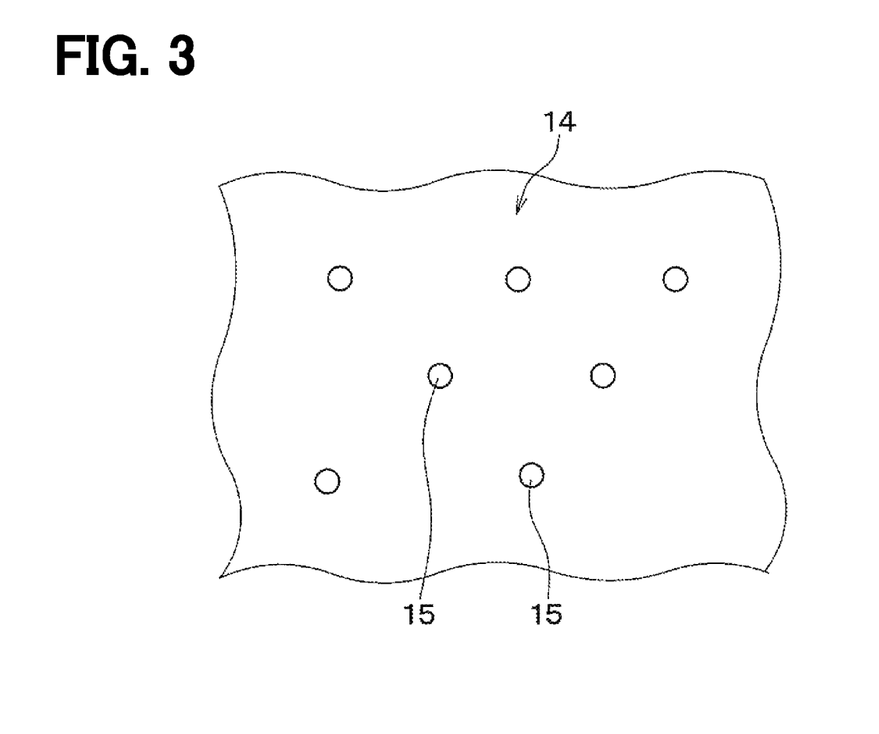
FIG. 3 is a schematic view of a heat transfer medium according to the first embodiment.

The ion adsorbent is dispersed in the base material. The ion adsorbent flows through the heat transfer medium circuit 12 together with the heat transfer medium 14. As shown in FIG. 3, the ion adsorbent is made of a plurality of solid particles 15. Each of the plurality of solid particles 15 is made from an ion exchange resin which is an ion exchanger. The ion exchange resin is an organic ion exchanger containing a skeleton of a synthetic resin and an ion exchange group introduced into the skeleton. The skeleton has a three-dimensional mesh structure. The ion exchange group is a group capable of exchanging ions. The ion exchange group releases ions by exchanging them with target ions for exchange.

In the present embodiment, the plurality of solid particles 15 are formed of those made from a cation exchange resin and those made from an anion exchange resin. As an ion exchange resin, the cation exchange resin exchanges cations introduced into the skeleton with target cations for exchange. The cations introduced into the skeleton are hydrogen ions. The anion exchange resin exchanges anions introduced into the skeleton with target anions for exchange. The anions introduced into the skeleton are hydroxide ions.

The particle size of each of the plurality of solid particles 15 is preferably 100 nm or more and 50 μm or less. By having the particle size of 100 nm or more, fluidity of the solid particles 15 that adsorbed ions can be lowered as compared to the ions themselves. As a result, the electrical conductivity can be lowered by adsorbing the ions by the plurality of solid particles 15. By having the particle size of 50 μm or less, occurrence of clogging in the flow passage for the heat transfer medium 14 can be avoided.

Next, the effects of this embodiment are explained.

The heat transfer medium 14 according to the present embodiment includes the water containing the freezing point depression agent and the orthosilicic acid ester, and does not include an ionic rust inhibitor. Accordingly, since the heat transfer medium 14 does not include an ionic rust inhibitor, the heat transfer medium 14 has lower electrical conductivity than a heat transfer medium containing an ionic rust inhibitor. More specifically, the conductivity of the heat transfer medium 14 is set to be 50 pS/cm or less, preferably fall within the range of 1 μS/cm, inclusive, to 5 μS/cm, inclusive.

However, if the heat transfer medium 14 does not contain an ion adsorbent unlike the present embodiment and the heat transfer medium 14 continues to flow through the heat transfer medium circuit 12, an amount of ions in the heat transfer medium 14 would increase over time due to various reasons. As a result, the electrical conductivity of the heat transfer medium 14 would increase. Thus, the electrical conductivity of the heat transfer medium 14 cannot be kept in a low level.

Further, the present inventors have found that an increase in the electrical conductivity of the heat transfer medium 14 is most affected by the ions released from flux adhering to members constituting the refrigerant heat exchanger 18. Specifically, the refrigerant heat exchanger 18 is a plate laminated type heat exchanger. A brazing material is used to join plates together. Thus, a large amount of brazing material and flux are used in the refrigerant heat exchanger 18. Flux adheres to the plates, which are members constituting the refrigerant heat exchanger 18. When the heat transfer medium 14 flows through the refrigerant heat exchanger 18, the flux is gradually released into the heat transfer medium 14. Therefore, if the heat transfer medium 14 does not contain an ion adsorbent, the heat transfer medium 14 would contain a large amount of cations and anions generated from the flux.

When the members constituting the refrigerant heat exchanger 18 contain aluminum, KF is usually used as flux. In this case, cations and anions generated from the flux are potassium ions and fluoride ions. That is, in this embodiment, potassium ions and fluoride ions correspond to the heat exchanger-derived ions released from the refrigerant heat exchanger 18 into the heat transfer medium.

In view of this, the heat transfer medium 14 of the present embodiment includes the ion adsorbent. This ion adsorbent adsorbs both the potassium ions and the fluoride ions.

Specifically, some of the solid particles 15 among the plurality of solid particles 15 are made from a cation exchange resin including hydrogen ions as an ion exchange group. Therefore, some of the solid particles adsorb the potassium ions in the heat transfer medium 14 and release the hydrogen ions into the heat transfer medium 14. In this way, the potassium ions in the heat transfer medium 14 and the hydrogen ions in the solid particles are exchanged with each other.

Furthermore, the remaining solid particles 15 among the plurality of solid particles 15 are made from an anionic exchange resin including hydroxide ions as an ion exchange group. Therefore, the remaining solid particles adsorb the fluoride ions in the heat transfer medium 14 and release the hydroxide ions into the heat transfer medium 14. In this way, the fluoride ions in the heat transfer medium 14 and the hydroxide ions in the solid particles are exchanged with each other. The hydrogen ions and hydroxide ions that are both released into the heat transfer medium 14 react with each other to form water.

As a result, even if both the potassium ions and the fluoride ions are released into the heat transfer medium 14, both ions can be adsorbed by the ion adsorbent. Therefore, increase in an amount of ions in the heat transfer medium 14 can be avoided as compared to the heat transfer medium 14 without the ion adsorbent. Thus, the electrical conductivity of the heat transfer medium 14 can be kept in a low level over time.

Figure 4:
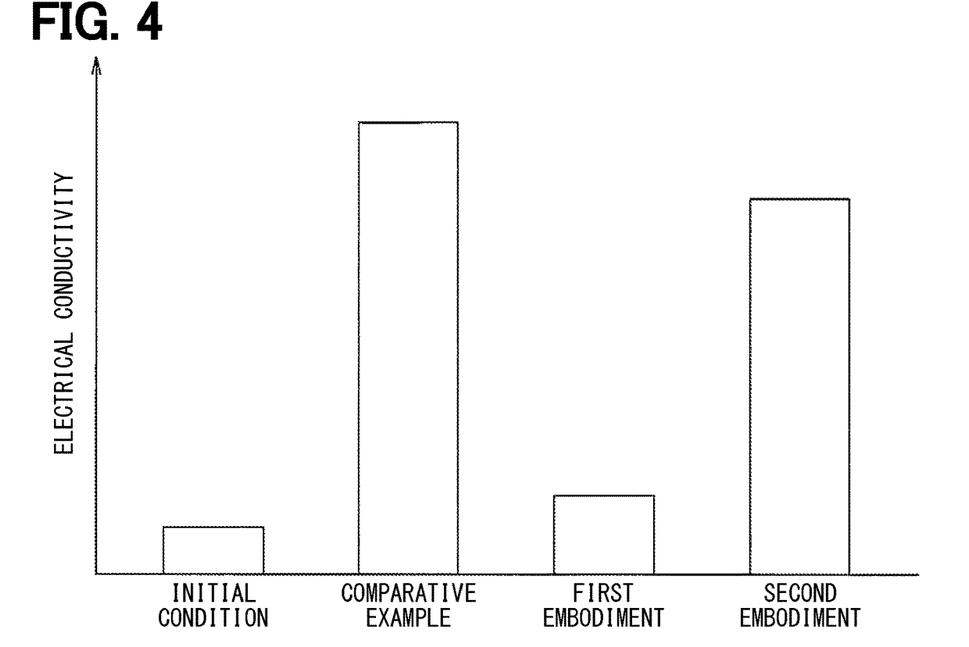
FIG. 4 is a measurement result of electrical conductivity of each of the heat transfer mediums according to the first embodiment, a second embodiment, and a comparative example.

FIG. 4 illustrates an experimental result showing the effect of the heat transfer medium 14 of the present embodiment. In this experiment, 100 ml of a heat transfer medium, 50 mg of KF, 1.8 g of solid particles made from an anion exchange resin, and 0.8 g of solid particles made from a cation exchange resin were used. The heat transfer medium used here included a freezing point depression agent and an orthosilicic acid ester, but did not include an ionic rust inhibitor.

KF was added to the heat transfer medium. As a result, a state in which potassium ions and fluoride ions generated from flux were present in the heat transfer medium was reproduced. Further, solid particles made from an anion exchange resin and solid particles made from a cation exchange resin were added to the heat transfer medium. The heat transfer medium was kept at 45° C. for 55 days. Then, the electrical conductivity of the heat transfer medium was measured after the medium was kept.

Further, as a comparative example of the present embodiment, a heat transfer medium containing KF without solid particles made from an anion exchange resin and solid particles made from a cation exchange resin was kept at 45° C. for 55 days. Then, the electrical conductivity of the heat transfer medium was measured after the medium was kept.

As shown in FIG. 4, in the heat transport medium of the comparative example, the electrical conductivity after it was kept is significantly increased as compared to the initial condition of the heat transfer medium before KF was added. On the other hand, in the heat transfer medium of the present embodiment, the electrical conductivity after it was kept is decreased as compared to the heat transfer medium according to the comparative example. It was confirmed that the increase in conductivity was suppressed.

In this embodiment, the ions adsorbed by the ion adsorbent are not necessarily limited to potassium ions and fluoride ions. Even when flux is a compound other than KF, the ion adsorbent can adsorb both cations and anions generated from the flux. In addition, the ion adsorbent can adsorb other cations and anions that are present in the heat transfer medium 14 due to other factors. Examples of other cations include metal ions released from members constituting a heat exchanger such as the refrigerant heat exchanger 18, the air heat exchanger 20, and the oil heat exchanger 22. Examples of other anions include carbonate ions generated from carbon dioxide contained in the heat transfer medium 14 from an air. Therefore, it is possible to prevent ions from increasing in the heat transfer medium 14. Thus, the electrical conductivity of the heat transfer medium 14 can be kept in a low level over time.

Further, according to the heat transfer medium 14 of the present embodiment, the solid particles 15 are made from an ion exchange resin with the skeleton made of a synthetic resin. Since the skeleton is made from a synthetic resin, it is easy to produce a plurality of solid particles 15. Further, since the skeleton is made from a synthetic resin, the size of each of the solid particles can be easily controlled when the plurality of solid particles 15 are formed. Further, since the skeleton is made from a synthetic resin, the manufacturing cost can be lowered as compared to a skeleton made of a material, such as an inorganic material, other than the synthetic resin.

In the present embodiment, the plurality of solid particles 15 made from a cation exchange resin and the plurality of solid particles 15 made from an anion exchange resin are used. However, the plurality of solid particles 15 made from an ion exchange resin in which both cations and anions are introduced in advance into the common skeleton may be used.

In the present embodiment, the heat transfer medium 14 does not include an ionic rust inhibitor. However, as long as the heat transfer medium 14 has low electrical conductivity, the heat transfer medium 14 may contain an ionic rust inhibitor. That is, since the heat transfer medium 14 contains the orthosilicic acid ester, an amount of the ionic rust inhibitor can be reduced as compared to a conventional heat transfer medium. As a result, initial electrical conductivity of the heat transfer medium can be lowered as compared to a conventional heat transfer medium containing an ionic rust inhibitor.

Second Embodiment

In the present embodiment, the plurality of solid particles 15 made from an anion exchange resin are used. That is, the solid particles 15 made from a cation exchange resin are not used. Other than this, the configuration of the system 10 is the same as that of the first embodiment.

According to the present embodiment, the anions in the heat transfer medium 14 can be adsorbed by the ion adsorbent. For that reason, the same effects as those of the first embodiment can be obtained.

FIG. 4 illustrates an experimental result showing the effect of the heat transfer medium 14 according to the second embodiment. FIG. 4 shows the electrical conductivity of the heat transfer medium according to the second embodiment where KF and the solid particles made from an anion exchange resin were added to the heat transfer medium and the heat transfer medium was kept at 45° C. for 55 days. As shown in FIG. 4, the electrical conductivity of the heat transfer medium according to the second embodiment is lower than the heat transfer medium according to the comparative example.

In this embodiment, the ions adsorbed by the ion adsorbent are not necessarily limited to ions derived from the heat exchanger. The ion adsorbent can adsorb other anions that are present in the heat transfer medium because of other factors. Examples of other anions include carbonate ions generated from carbon dioxide contained in the heat transfer medium from an air.

Third Embodiment

In the present embodiment, the plurality of solid particles 15 made from a cation exchange resin are used. That is, the solid particles 15 made from a cation exchange resin are not used. Other than this, the configuration of the system 10 is the same as that of the first embodiment.

Even if flux does not adhere to the refrigerant heat exchanger 18, if the heat transfer medium 14 continues to flow through the heat transfer medium circuit 12, ions are released from members constituting the refrigerant heat exchanger 18 into the heat transfer medium 14. For example, when the members constituting the refrigerant heat exchanger 18 contain Al, Al ions are released from the members constituting the refrigerant heat exchanger 18 into the heat transfer medium 14. The present inventors have found that this is a factor for increasing the electrical conductivity of the heat transfer medium 14.

According to the present embodiment, the Al ions can be adsorbed by the ion adsorbent. For that reason, the same effects as those of the first embodiment can be obtained. That is, in this embodiment, the Al ions correspond to heat exchanger-derived ions released from the refrigerant heat exchanger into the heat transfer medium.

In this embodiment, the ions adsorbed by the ion adsorbent are not necessarily limited to ions derived from the heat exchanger. The ion adsorbent can adsorb other cations that are present in the heat transfer medium 14 because of other factors.

Fourth Embodiment

In this embodiment, the heat transfer medium 14 further includes a Si compound represented by the following formula (I), (II) or (III).

[Chemical Formula 2]

(I)

$R^1$ to $R^3$ in formula (I) are groups that are the same or different from each other and do not contain oxygen directly bound to Si in the formula. Z in formula (I) represents a group that contains oxygen directly bound to Si in the formula. The group that does not contain oxygen directly bound to Si in the formula may be either water-soluble or water-insoluble. The group that does not contain oxygen directly bound to Si in the formula is a group that does not contain oxygen or a group that contains oxygen not directly bonded to Si in the formula.

Examples of the group that do not contain oxygen include an unsubstituted or partially substituted hydrocarbon group. The hydrocarbon group may be saturated or unsaturated, cyclic, side chain, or linear hydrocarbon group, or a combination thereof. Examples of the hydrocarbon group include an alkyl group having 1 to 20 carbon atoms, an alkenyl group having 2 to 20 carbon atoms, and an aryl group having 6 to 12 carbon atoms.

Examples of those in which a part of the hydrocarbon group is substituted include one in which some of hydrogen of the hydrocarbon group is substituted with halogen or pseudohalogen. Examples of the halogen include chlorine, fluorine, bromine, iodine and the like. Pseudohalogens are atomic groups with properties similar to a halogen atom. Examples of the pseudohalogen include isothiocyanate and CN. Examples of those in which a part of the hydrocarbon group is substituted include $CF_3(CF_2)_m(CH_2)_n$. m, n represent integers.

Examples of the group that contain oxygen not directly bound to Si in the formula include an aldehyde group, a carbonyl group, a carboxyl group, a nitro group, a sulfo group, a group containing an ester bond, and a group containing an ether bond.

Z is a group represented by O—$R^4$. $R^4$ is a hydrogen or hydrocarbon group or the like. The hydrocarbon groups include not only unsubstituted ones but also partially substituted ones. Examples of the hydrocarbon group include an alkyl group having 1 to 20 carbon atoms, an alkenyl group having 2 to 20 carbon atoms, and an aryl group having 6 to 12 carbon atoms. $R^4$ may be an oxygen-containing group.

[Chemical Formula 3]

(II)

$R^1$ and $R^2$ in formula (II) are groups that are the same or different from each other and do not contain oxygen directly bound to Si in the formula. $Z^1$ and $Z^2$ in formula (II) are groups that are the same or different from each other and contain oxygen directly bound to Si in the formula. The description of the group that does not contain oxygen directly bound to Si in the formula is the same as the description in formula (I).

$Z^1$ is a group represented by O—$R^4$. Z2 is a group represented by O—$R^5$. $R^4$ and $R^5$ may be the same or different from each other. $R^4$ and $R^5$ are a hydrogen or hydrocarbon group or the like. The hydrocarbon groups include not only unsubstituted ones but also partially substituted ones. Examples of the hydrocarbon group include an alkyl group having 1 to 20 carbon atoms, an alkenyl group having 2 to 20 carbon atoms, and an aryl group having 6 to 12 carbon atoms. $R^4$ and $R^5$ may be an oxygen-containing group.

[Chemical Formula 4]

(III)

R in formula (III) represents a water-insoluble group that does not contain oxygen directly bound to Si in the formula. $Z^1$, $Z^2$, and $Z^3$ in formula (III) are groups that are the same or different from each other and contain oxygen directly bound to Si in the formula.

The water-insoluble group is a non-polar group that does not hydrate with water molecules. The group that does not contain oxygen directly bound to Si in the formula is a group that does not contain oxygen or a group that contains oxygen not directly bound to Si in the formula. The description of the group that contains oxygen not directly bound to Si in the formula is the same as the description in formula (I).

Examples of the water-insoluble group that does not contain oxygen directly bound to Si in the formula include an alkyl group (for example, methyl group, ethyl group, etc.), an unsaturated hydrocarbon group (for example, vinyl group, allyl group, methylene), and a cyclic hydrocarbon group (for example, cyclohexyl group, phenyl group, etc.). The hydrocarbon groups include not only unsubstituted ones but also partially substituted ones.

Examples of the group in which a part thereof is substituted include one in which some of hydrogens are substituted with halogen or pseudohalogen. Examples of the halogen include chlorine, fluorine, bromine, iodine and the like. Pseudohalogens are atomic groups with properties similar to a halogen atom. Examples of the pseudohalogen include isothiocyanate and CN. Examples of the group in which a part thereof is substituted include $CF_3(CF_2)_m(CH_2)_n$. m, n represent integers.

$Z^1$ is a group represented by O—$R^4$. $Z^2$ is a group represented by O—$R^5$. $Z^3$ is a group represented by O—$R^6$.

$R^4$, $R^5$, and $R^6$ may be the same or different from each other. $R^4$, $R^5$, and $R^6$ are a hydrogen or hydrocarbon group or the like. The hydrocarbon groups include not only unsubstituted ones but also partially substituted ones. Examples of the hydrocarbon group include an alkyl group having 1 to 20 carbon atoms, an alkenyl group having 2 to 20 carbon atoms, and an aryl group having 6 to 12 carbon atoms. $R^4$, $R^5$, and $R^6$ may be an oxygen-containing group.

The Si compound represented by formula (I), (II) or (III) is produced via, e.g., an orthosilicic acid ester.

It should be noted that only one of the Si compounds represented by formula (I), (II) and (III) is not necessarily contained in the heat transfer medium. That is, two or more of the Si compounds represented by formulas (I), (II) and (III) may be contained in the heat transfer medium.

Figure 5:
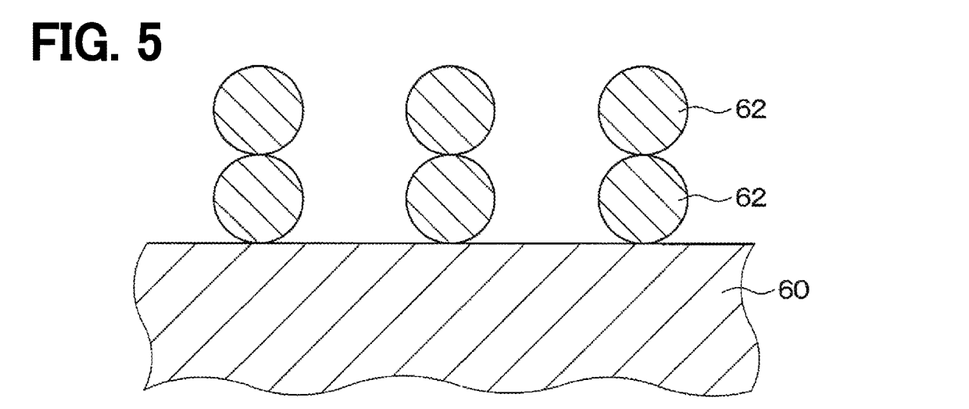
FIG. 5 is a diagram for explaining the effect of a fourth embodiment, and is a schematic view showing a cross-section of a flow passage forming member.

Here, if a heat transfer medium not containing the Si compound represented by formula (I), (II) or (III) but containing an orthosilicic acid ester is used, compounds 62 containing Si whose precursor is the orthosilicic acid ester are bound to the surface of the flow passage forming member 60. The flow passage forming member 60 is a member that defines a flow passage therein through which the heat transfer medium flows. Examples of the flow passage forming member 60 include a portion of a heat exchanger, such as the refrigerant heat exchanger 18, which defines a flow passage for the heat transfer medium. By covering the surface of the flow passage forming member 60 with the compounds 62, deterioration of the flow passage forming member 60 due to contact of the heat transfer medium with the surface of the flow passage forming member 60 can be suppressed.

However, a portion not covered with the compounds 62 exists on the surface of the flow passage forming member 60. The portion not covered with the compounds 62 is deteriorated by the heat transfer medium in contact with the surface. Due to this deterioration, ions are released from the flow passage forming member 60 into the heat transfer medium 14.

More specifically, the orthosilicic acid ester molecule has four oxygen atoms directly bound to the Si atom. Another atom or group is bound to these oxygen atoms. The molecule of the orthosilicic acid ester is decomposed into a portion containing Si and a portion not containing Si at the four oxygen atoms. Others are newly bound to the portion containing Si after decomposition. That is, reactions such as hydrolysis and condensation polymerization occur at the oxygen atoms.

Therefore, when a heat transfer medium containing an orthosilicic acid ester is used, one oxygen atom among the four oxygen atoms in the orthosilicic acid ester molecule is hydrolyzed. Accordingly, the orthosilicic acid ester is decomposed into a portion containing Si and the remaining portion not containing Si. Dehydration condensation occurs between the hydroxyl group of the portion containing Si after decomposition and the hydroxyl group existing on the surface of the flow passage forming member 60. As a result, the decomposed portion containing Si is bound to the surface of the flow passage forming member 60. The decomposed portion containing Si is the compound 62 whose precursor is the orthosilicic acid ester.

The compound 62 whose precursor is another orthosilicic acid ester in the heat transfer medium is newly bound to the compound 62 that is bound to the surface of the flow passage forming member 60. Therefore, a portion not covered with the compounds 62 whose precursor is the orthosilicic acid ester exists on the surface of the flow passage forming member 60. The portion not covered with the compounds 62 is deteriorated by the heat transfer medium in contact with the surface.

Figure 6:
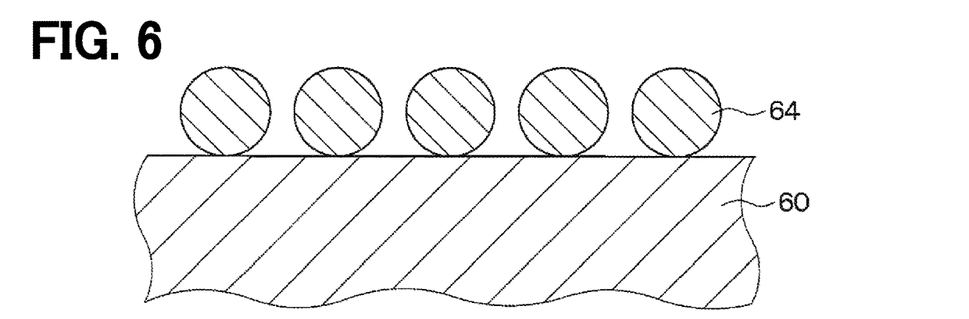
FIG. 6 is a diagram for explaining the effect of the fourth embodiment, and is a schematic view showing a cross-section of a flow passage forming member.

On the contrary, according to the present embodiment, the heat transfer medium 14 contains the Si compound represented by formula (I), (II) or (III) in addition to the orthosilicic acid ester. In the molecule of this Si compound, three or less oxygen elements are directly bound to the Si atom. Therefore, the molecule of the Si compound is also decomposed at the portion of the oxygen atom, and as shown in FIG. 6, the decomposed portions 64 containing the Si is bound to the surface of the flow passage forming member 60. The decomposed portions 64 containing Si are the compounds 64 whose precursor is the Si compound in the heat transport medium.

The molecule of the Si compound has a smaller number of oxygen atoms directly bound to the Si atom and has a smaller number of parts where a chemical reaction of decomposition and binding occurs, as compared to the orthosilicic acid ester. Therefore, as compared to the orthosilicic acid ester, the compound 64 whose precursor is the Si compound in the heat transfer medium does not bind to the compound 64 bound to the surface of the flow passage forming member 60, and thus the compound 64 is more likely to bind to the surface of the flow passage forming member 60. In other words, the number of the compounds 64 bound to the surface of the flow passage forming member 60 can be increased as compared to the orthosilicic acid ester under the condition that the same number of molecules is present in the heat transfer medium.

Therefore, according to the present embodiment, an area of the surface of the flow passage forming member 60 that is not covered with the compounds 62, 64 can be reduced as compared to a heat transfer medium that does not contain the SI compound represented by formula (I), (II) or (III) but contains an orthosilicic acid ester. As a result, it is possible to suppress ions to be released from the flow passage forming member 60 as compared to the above case. Thus, the electrical conductivity of the heat transfer medium can be kept in a low level over time.

In the fourth embodiment, the heat transfer medium 14 may preferably include the Si compound which is a compound represented by formula (I) or (II), and at least two of $R^1$ to $R^3$ in the formula (I) may be preferably groups that have molecular weights different from each other and do not contain oxygen. In this example, one of $R^1$ to $R^3$ may be a phenyl group, another of $R^1$ to $R^3$ may be a methyl group, and the remaining one of $R^1$ to $R^3$ may be an ethyl group. Furthermore, when the Si compound is represented by formula (II), $R^1$ and $R^2$ in the formula (II) may be preferably groups that have molecular weights different from each other and do not contain oxygen. In this example, one of $R^1$ and $R^2$ may be a phenyl group and the other of $R^1$ and $R^2$ may be a methyl group.

Alternatively, in the heat transfer medium 14 in the fourth embodiment, at least one of $R^1$ to $R^3$ in the formula (I) may be preferably a group not containing oxygen but containing halogen or pseudohalogen. Then, at least one of $R^1$ and $R^2$ in the formula (II) may be preferably a group not containing oxygen but containing halogen or pseudohalogen, and R in the formula (III) may be a group not containing oxygen but containing halogen or pseudohalogen.

In the fourth embodiment, a mass ratio of the orthosilicic acid ester to the heat transfer medium 14 may be preferably greater than a mass ratio of the Si compound to the heat transfer medium 14.

Other Embodiments (1) In the first embodiment, the ion adsorbent adsorbs cations from the heat transfer medium 14 and, at the same time, releases hydrogen ions into the heat transfer medium 14. However, the ion adsorbent may release cations other than the hydrogen ions. In this case, the released cations may be capable of more lowering the electrical conductivity of the heat transfer medium 14 as compared to when cations to be adsorbed are present in the heat transfer medium 14. That is, the cations to be released may have a lower electronegativity than the cations to be adsorbed.

Further, in the first embodiment, the ion adsorbent adsorbs anions from the heat transfer medium 14 and, at the same time, releases hydroxide ions into the heat transfer medium 14. However, the ion adsorbent may release anions other than the hydroxide ions. In this case, the released anions may be capable of more lowering the electrical conductivity of the heat transfer medium 14 as compared to when anions to be adsorbed are present in the heat transfer medium 14. That is, the anions to be released may have a lower electronegativity than the cations to be adsorbed.

(2) In each of the above embodiments, the plurality of solid particles 15 are made of an ion exchange resin. However, the plurality of solid particles 15 may be made of another organic ion exchanger. Further, the plurality of solid particles 15 may be made of another ion exchanger, that is, an inorganic ion exchanger. Examples of the inorganic ion exchanger include zeolite and colloidal silica.

(3) In each of the above embodiments, the ion adsorbent is made of an ion exchanger. However, the ion adsorbent may be one that adsorbs ions without exchanging ions.

(4) In each of the above embodiments, the oil heat exchanger 22 is a heat exchanger that is configured to cause the heat transfer medium 14 to receive heat from an oil 36 through heat exchange with the oil 36 that has received heat from the travelling electric motor 2. However, the oil heat exchanger 22 may be a heat exchanger that releases heat from the heat transfer medium by exchanging heat with an oil used as a heat exchange medium.

(5) In each of the above embodiments, the thermal management system 10 is configured to cool the battery 4, the inverter 6 and the travelling electric motor 2 (i.e., a motor generator) using the heat transfer medium. However, the system 10 may be also used to cool a fuel cell mounted in a fuel cell vehicle.

(6) The present disclosure is not limited to the foregoing description of the embodiments and can be modified. The present disclosure may also be varied in many ways. Such variations are not to be regarded as departure from the disclosure, and all such modifications are intended to be included within the scope of the disclosure. The above embodiments are not independent of each other, and can be appropriately combined except when the combination is obviously impossible. Further, in each of the above-mentioned embodiments, it goes without saying that components of the embodiment are not necessarily essential except for a case in which the components are particularly clearly specified as essential components, a case in which the components are clearly considered in principle as essential components, and the like. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Furthermore, a material, a shape, a positional relationship, or the like, if specified in the above-described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

(Overview)

According to a first aspect as shown in part or all of the above embodiments, the liquid heat transfer medium that transfers heat received from the vehicle traveling battery that generates heat during charging and discharging includes a liquid base material, an orthosilicic acid ester compatible with the base material, and an ion adsorbent dispersed in the base material. The ion adsorbent is formed of a plurality of solid particles and adsorbs at least one of anions and cations existing in the heat transfer medium.

Further, according to a second aspect, the ion adsorbent adsorbs both the anions and the cations.

Accordingly, even if both the anions and cations increase in the heat transfer medium, both ions can be adsorbed by the ion adsorbent. Therefore, the increase of ions in the heat transfer medium can be suppressed as compared to when the ion adsorbent adsorbs only either one of anions or cations. Thus, the electrical conductivity of the heat transfer medium can be further kept in a low level over time.

Further, according to a third aspect, the plurality of solid particles are made of an ion exchange resin whose skeleton is made of a synthetic resin.

Since the skeleton is made from a synthetic resin, it is easy to produce a plurality of solid particles. Further, since the skeleton is made from a synthetic resin, the size of each of the solid particles can be easily controlled when the plurality of solid particles are formed. Further, since the skeleton is made from a synthetic resin, the manufacturing cost can be lower as compared to a skeleton made of a material, such as an inorganic material, other than the synthetic resin.

According to a fourth aspect, the heat transfer medium further includes Si compound represented by the formula (I), (II) or (III).

Accordingly, as compared to when only the orthosilicic acid ester is contained, the release of ions from the flow passage forming member that defines the flow passage through which the heat transfer medium flows can be more suppressed. Thus, the electrical conductivity of the heat transfer medium can be kept in a low level over time.

According to a fifth aspect, the vehicle thermal management system mounted in a vehicle includes a vehicle driving battery that generates heat during charging or discharging, a liquid heat transfer medium that transfers heat received from the battery, a heat receiver that causes the heat transfer medium to receive heat from the battery through heat exchange, and a heat exchanger that causes the heat transfer medium to release the heat through heat exchange with a heat exchange medium. The heat transfer medium includes a liquid base material, an orthosilicic acid ester compatible with the base material, and an ionic adsorbent dispersed in the base material. The ion adsorbent is formed of a plurality of solid particles and adsorbs at least one of anions and cations that exist in the heat transfer medium and are released from the heat exchanger into the heat transfer medium.

Further, according to a sixth aspect, a flux for brazing adheres to members constituting the heat exchanger. The ions from the heat exchanger are both cations and anions generated from the flux.

Further, the present inventors have found that an increase in the electrical conductivity of the heat transfer medium is most affected by the release of ions from the fluxes adhering to the members constituting the heat exchanger. Therefore, the increase in conductivity can be suppressed most effectively.

Also, according to a seventh aspect, the heat exchange medium is air, oil or a refrigerant for the refrigeration cycle system. A heat exchanger that exchanges heat with such a heat exchange medium can be used.

The invention claimed is:

1. A thermal management system that controls heat generated from a heat generator during charging and discharging or through power conversion, the system comprising:
    a heat transfer medium that transfers the heat from the heat generator; and
    a heat transfer medium circuit through which the heat transfer medium flows, wherein
    the heat medium circuit includes a heat exchanger that is configured to cause the heat transfer medium to release the heat through heat exchange with a heat exchange medium, and
    the heat transfer medium includes a liquid base material and a Si compound represented by following formula (II), (II)

$R^1$ and $R^2$ in formula (II) are groups that are the same or different from each other and do not contain oxygen directly bound to Si in the formula, $Z^1$ and $Z^2$ in formula (II) are groups that are the same or different from each other and contain oxygen directly bound to Si in the formula, wherein
the liquid base material is water, and
the heat transfer medium further includes an orthosilicic acid ester.

2. The thermal management system according to claim 1, wherein
    the Si compound is a compound represented by the formula (II), and
    $R^1$ and $R^2$ in the formula (II) are groups that have molecular weights different from each other and do not contain oxygen.

3. The thermal management system according to claim 1, wherein
    at least one of $R^1$ and $R^2$ in the formula (II) is a group containing halogen or pseudohalogen and does not contain oxygen.

4. The thermal management system according to claim 1, wherein
    a mass ratio of the orthosilicic acid ester to the heat transfer medium is greater than a mass ratio of the Si compound to the heat transfer medium.

5. The thermal management system according to claim 1, wherein
    the heat exchanger includes a portion that is made of a material containing aluminum, the portion being in contact with the heat transfer medium.

6. The thermal management system according to claim 1, wherein
    the heat exchange medium is air, oil or refrigerant for a refrigeration cycle system.

7. The thermal management system according to claim 1, wherein
    the thermal management system is mounted in a vehicle, and
    the heat generator is a battery, a fuel cell mounted in a vehicle, an inverter mounted in a vehicle, or a motor generator mounted in a vehicle.

8. A heat transfer medium that transfers heat from a heat generator, the medium comprising:
    a liquid base material; and
    a Si compound represented by following formula (II), $R^1$ and $R^2$ in formula (II) are groups that are the same or different from each other and do not contain oxygen directly bound to Si in the formula, $Z^1$ and $Z^2$ in formula (II) are groups that are the same or different from each other and contain oxygen directly bound to Si in the formula, wherein
the liquid base material is water, and
the heat transfer medium further includes an orthosilicic acid ester.

9. The heat transfer medium according to claim 8, wherein
    the Si compound is a compound represented by the formula (II), and
    $R^1$ and $R^2$ in the formula (II) are groups that have molecular weights different from each other and do not contain oxygen.

10. The heat transfer medium according to claim 8, wherein
    at least one of $R^1$ and $R^2$ in the formula (II) is a group containing halogen or pseudohalogen and does not contain oxygen.

11. The heat transfer medium according to claim 8, wherein
    a mass ratio of the orthosilicic acid ester to the heat transfer medium is greater than a mass ratio of the Si compound to the heat transfer medium.

* * * * *